March 26, 1957     A. SFREDDA     2,786,540
NON-CIRCULAR WHEELED VEHICLE
Filed May 13, 1954
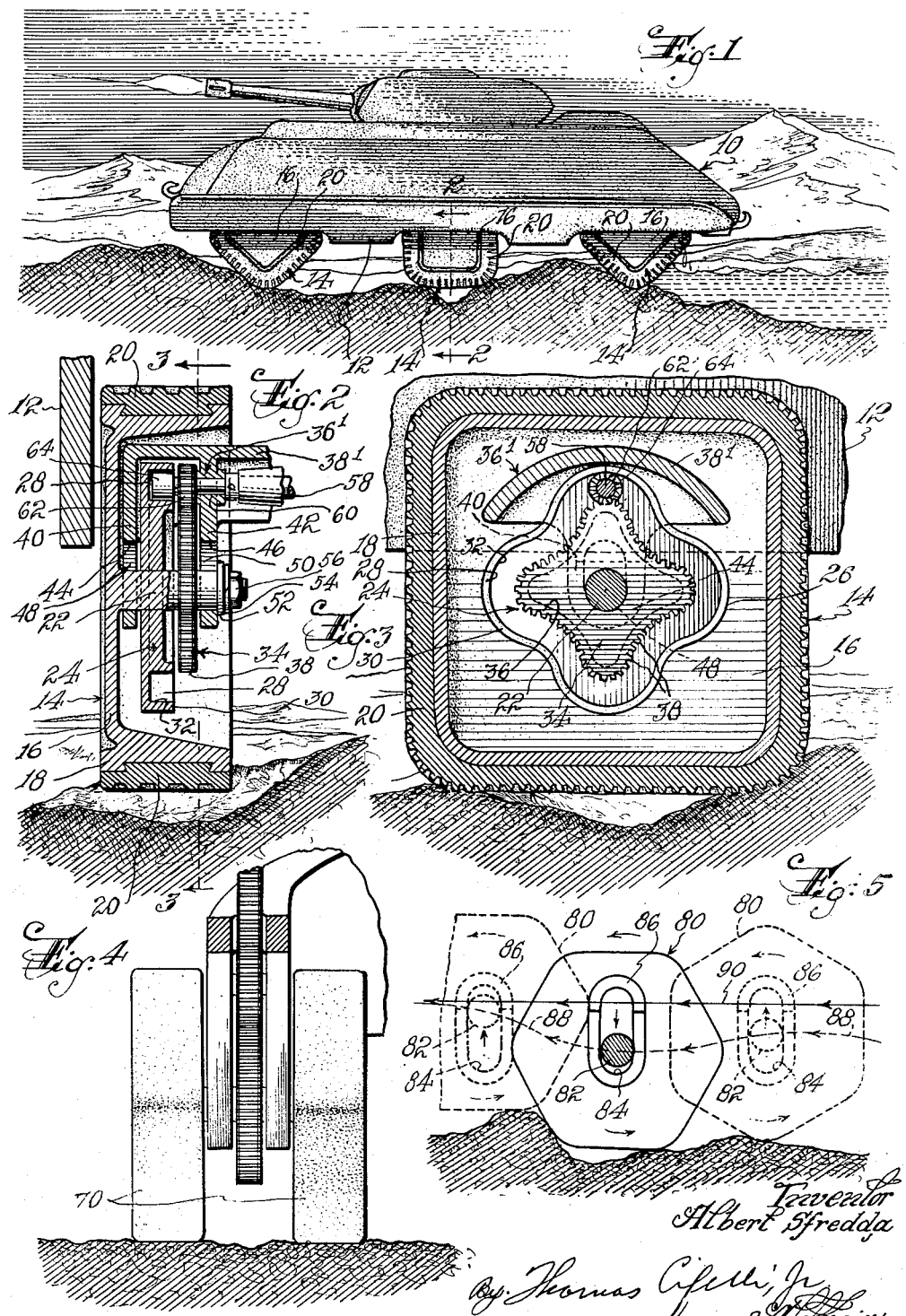

United States Patent Office 2,786,540
Patented Mar. 26, 1957

2,786,540
NON-CIRCULAR WHEELED VEHICLE

Albert Sfredda, Bethlehem, Pa., assignor of one-fourth to James Boyd Painter and one-fourth to Louis Zapco, both of Flemington, N. J.

Application May 13, 1954, Serial No. 429,563

11 Claims. (Cl. 180—22)

The present invention relates to land vehicles or the like and particularly to the ground contacting portions thereof.

The major problems in the field of land vehicle movement are providing adequate traction and a smooth ride. This is particularly true of those vehicles which must traverse soft, irregular, rough or uneven terrain, such as military vehicles of varied types, multi-purpose utility cars, commonly known as "jeeps," and farm vehicles, such as tractors.

It is an object of this invention to provide an improved land vehicle or the like which is able to smoothly traverse soft, irregular, rough or uneven terrain with good ground contact, i. e., traction, at all times.

According to the invention, the object is accomplished by providing on a vehicle a plurality of non-circular wheels and mounting each of them on the vehicle by a floating axle in such a manner that they always contact the ground as they rotate.

The above and other objects will become apparent from the following specification taken in conjunction with the attached drawing, wherein:

Figure 1 is a side elevation view of a vehicle incorporating my invention.

Figure 2 is a sectional view taken on line 2—2 of Figure 1 with portions shown in elevation.

Figure 3 is a sectional view taken on line 3—3 of Figure 2.

Figure 4 is a front elevation view of a portion of a vehicle and a pair of non-circular wheels contemplated by my invention.

Figure 5 is a diagrammatic view of a modified form of wheel in three relative positions which it assumes as it moves over the ground.

Referring to the drawing, Figure 1 shows a land vehicle 10, of the military tank type, having a continuous skirt 12 around its girth and a plurality of ground contacting wheels 14. As shown in Figure 1, there are three wheels on the side of the vehicle exposed to view; there are an equal number of wheels on the other side of the vehicle. It should be understood that any desired number of wheels may be employed, but that, in general, better overall performance is achieved by providing more wheels.

Each wheel 14 is shown in Figure 1 as being square, however, other non-circular, multi-sided configurations (polygons) such as a hexagon, octagon or the like may be employed. For simplicity and clarity the form of invention described will be the square wheel. As shown in Figure 1, all of the wheels are not mounted "in phase." It is meant by this that the corresponding sides of all of the wheels are not parallel; for example, in Figure 1, the first and third wheels are "in phase" because their corresponding sides are parallel, while the middle wheel is "out of phase" with the other two wheels, because its sides are not parallel to the corresponding sides of the first and third wheels. This "out of phase" relationship contributes to good traction, for it permits differently shaped edge portions of different wheels to simultaneously contact the ground at all times. For example, in Figure 1, a corner of each of the first and third wheels contacts the ground, while a flat side of the middle wheel contacts the ground. As the wheels rotate the portion of each wheel that contacts the ground changes, but differently shaped edge portions of at least two wheels always contact the ground.

The details of each square wheel 14 are shown in Figures 2 and 3. Each wheel comprises a disk-like web 16 having a flange-like rim 18 secured at its peripheral edge and a stub axle 22 secured centrally thereof. A tread 20, which may be of any conventional type, is secured to the rim 18 in a conventional manner.

Secured to axle 22 within the cavity formed by the web 16 and rim 18 is a disk 24 which is keyed in a conventional manner (not shown) to axle 22 and rotates with it. Disk 24 is generally square, but has slightly concave sides 26, see Figure 3. Disk 24 has a groove 28 formed on its axially inner side, near its periphery, which forms an inwardly extending flange 30. The radially inner side of flange 30 constitutes a continuous shoulder 32.

Secured to the axle 22 inwardly of disk 24 is a flat cam 34. Cam 34 is shaped similarly to but is smaller than disk 24, and is keyed in a conventional manner (not shown) to the shaft 22 to be rotatable therewith in tandem with disk 24. The major planes of the sides 36 of cam 34 are parallel to and spaced from the major planes of the sides 26 of the disk 24. The entire edge of cam 34 has gear teeth 38 formed thereon.

Each wheel 14 is secured to vehicle 10 individually. The vehicle has a plurality of wheel mounting brackets extending laterally at each side, one of which is shown in Figures 2 and 3. Bracket 36' comprises a laterally extending arcuate plate 38' that is secured to the vehicle at one end (not shown) and has two parallel, vertical walls 40 and 42, respectively formed at its other end. Walls 40 and 42 are similar in shape and include depending tabs 44 and 46, respectively, which have aligned, vertically disposed slots 48 and 50, respectively.

As can best be seen in Figure 2, axle 22 passes through slots 48 and 50 and is retained therein by washer 52, lock washer 54 and retaining nut 56. When the wheel is mounted on the bracket 36', the disk 24 and cam 34 are positioned in planes that pass between walls 40 and 42, and the axle 22 is vertically movable in aligned slots 48 and 50.

Operatively connected to the motive force producing means in the vehicle (not shown) is drive shaft 58. The drive shaft passes through opening 60 in wall 42, has a pinion 62 mounted thereon, which is in mesh with teeth 38 of cam 34, and has a roller 64 rotatably secured at its extremity and disposed in groove 28 in bearing contact with shoulder 32.

Floating action of the axle is accomplished in the following manner: rotation of the drive shaft 58 causes the pinion to drive the cam and thereby rotate the wheel. The axis of rotation of the wheel moves relative to a fixed point on the vehicle during rotation of the wheel due to the shape of the cam. As the wheel rotates, the axle 22 reciprocates in the slots 48 and 50, starting from its lowermost position (shown in Figures 2 and 3) when the flat side of the wheel is parallel to the plane of the ground, to its highest position (near the top of the slots) when a corner of the wheel contacts the ground. Due to this floating action of axle 22, the lowermost portion of the wheel is always the same distance from a fixed point on the vehicle, such as the pinion 62 and, therefore, always lies in the same general plane as that of the ground. This obtains, regardless of which part of the wheel is lowermost.

A vehicle equipped with square wheels of the type contemplated by my invention gives better traction and a smoother ride when used on rough terrain than one having circular wheels. Following are the reasons: the sides of a square wheel constitute large flat surfaces for bridging ruts and cavities in the ground whereas a circular wheel follows the surface of the ground and enters many ruts; and the sides of a square wheel provide a large contacting area with the ground when they lie parallel thereto, and, hence, afford better pushing effect, whereas a round wheel affords only a small pushing area, which often results in causing a digging effect.

From the foregoing, it should be apparent that the floating axle arrangement is responsible for rotation of a square wheel without the bouncing effect one would expect in a square wheel, and that square wheels afford better traction and contribute to a smoother ride when used on rough terrain than a circular wheel.

In Figure 4 I have shown two wheels 70, of the type contemplated by my invention, mounted in a pair. This arrangement is desirable in some activities, such as some mechanized farm implements.

In Figure 5 I have shown a hexagonal wheel 80 in three relative positions. Its theory of operation is the same as a square wheel, and its construction is similar. In all modifications of my invention, the disk and cam must be similar in shape to the wheel which they are associated with. Figure 5 is intended to graphically show the floating action of the axle 82, which reciprocates vertically in slots 84 in vehicle tabs 86, as the wheel 80 rotates, while the vehicle itself travels forward in a smooth horizontal plane.

Wheel 80 rotates counter-clockwise and moves from right to left in Figure 5. As the wheel moves, the path described by the axle (the dotted line 88) is sinusoidal, whereas the path described by any arbitrarily selected point on the vehicle (the solid line 90) is substantially straight. It is this relationship which permits a smooth ride to be obtained with good traction by a vehicle traversing rough terrain.

The general performance of any of the modifications described or shown can be best maintained by appropriately encasing the operating mechanism, i. e., the cam, pinion, disk, roller, wheel mounting bracket, part of the drive shaft near the foregoing parts, and the axle in a lubricant filled housing.

The illustrated embodiments of the invention have been described in great detail for the purpose of exemplification. It should be understood that various modifications in the details of construction and in the application of my invention can be made by those skilled in the art without departing from the true spirit and scope of my invention as defined in the following claims.

What I claim as new and desire to secure by Letters Patent of the United States is:

1. A traction device for vehicles comprising a non-circular wheel, said wheel having an axle, sides and a similarly-shaped continuous non-circular cooperating member, said member comprising a gear-toothed cam and a shoulder generally similar to the configuration of said cam, said vehicle having portions defining a vertically disposed slot, said axle adapted to be positioned in said slot, means on said vehicle for contacting said member, said means comprising a pinion having teeth that mesh with the cam teeth and a roller rotatable with said pinion along said shoulder, whereby said axle is caused to reciprocate in said slot as said wheel rotates.

2. A device as defined in claim 1 wherein said wheel and said member are each multi-sided.

3. A device as defined in claim 2 wherein the sides of said wheel and said member are not parallel.

4. A device as defined in claim 3 wherein said member and said wheel are substantially square and angularly displaced with respect to each other.

5. A device as defined in claim 4 which includes means for driving said wheel.

6. A device as defined in claim 1 wherein said vehicle has means for rotating said pinion to thereby drive said cam.

7. A traction device for a vehicle comprising a wheel having a multi-sided rim with flat ground contacting sides, a web and an axle, said vehicle having axle supporting portions including slots, said axle mounted by said portions in said slots to be vertically movable within a limited range, said wheel having a shoulder defining a continuous multi-sided surface, said axle having a cam secured thereto, said cam being similar in configuration to said surface and said wheel and having gear teeth formed thereon, means on said vehicle for driving said cam and means on said vehicle for contacting said surface and thereby causing said cam and driving means to mesh at all times.

8. A device as defined in claim 7 wherein said surface and said cam are similar and co-axial.

9. A device as defined in claim 8 wherein the sides of said surface and said cam are equally spaced from each other throughout and are disposed with relation to the sides of said wheel so as to be angularly displaced, whereby they have their apices directed toward flat sides of said wheel.

10. A device as defined in claim 9 wherein said wheel, cam and surface are each generally square.

11. A device as defined in claim 7 wherein said shoulder is part of a groove and said contacting means comprise a roller adapted to roll in said groove.

References Cited in the file of this patent

UNITED STATES PATENTS 2,256,570     Kopezynski     Sept. 23, 1941
2,403,812     MacCallum     July 9, 1946

OTHER REFERENCES

Publication: "Automotive Industries," May 15, 1949, page 20, article, "Egg-shaped for Traction."